US006742145B2

(12) United States Patent
Bailey et al.

(10) Patent No.: US 6,742,145 B2
(45) Date of Patent: May 25, 2004

(54) METHOD OF DE-ALLOCATING MULTIPLE PROCESSOR CORES FOR AN L2 CORRECTABLE ERROR

(75) Inventors: Sheldon Ray Bailey, Rochester, MN (US); Michael Alan Kobler, Rochester, MN (US); Michael Youhour Lim, Leander, TX (US); Stuart Allen Werbner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 09/798,161

(22) Filed: Mar. 1, 2001

(65) Prior Publication Data

US 2002/0133759 A1 Sep. 19, 2002

(51) Int. Cl.$^7$ .................................................. G06F 11/00
(52) U.S. Cl. ............................ 714/42; 714/54; 711/147; 700/5
(58) Field of Search ............................... 714/42, 45, 54, 714/57; 711/122, 147; 700/5

(56) References Cited

U.S. PATENT DOCUMENTS

| 5,067,071 A | * | 11/1991 | Schanin et al. | 710/113 |
| 5,327,550 A | * | 7/1994 | Pribnow | 714/39 |
| 5,423,026 A | * | 6/1995 | Cook et al. | 714/23 |
| 6,574,748 B1 | * | 6/2003 | Andress et al. | 714/11 |

* cited by examiner

*Primary Examiner*—Scott Baderman
(74) *Attorney, Agent, or Firm*—Duke W. Yee; Mark E. McBurney; Michael R. Nichols

(57) ABSTRACT

A method of de-allocating multiple processor cores sharing a failing bank of memory is disclosed. The method allows new multiple-processor integrated circuits with on-chip shared memory to be de-allocated using existing technology designed for use with single-processor integrated circuit technology.

42 Claims, 4 Drawing Sheets

*FIG. 3*

```
305 {
        struct errlog {
            int error_code;
            int error_type;
            int sub_system;
            int device_id;  // 307
        };

310 {
        void log_this_error()
        {
            int rc = 0;    // return code
                           // 320
    330 {
            do {
                create_new_errlog();   // 332
                if (rc == 0)   // 333
                    fill_in_errlog_with_details();   // 334
                else
                    copy_new_errlog_with_last_errlog_data();   // 335 if (RS_platform)
                    rc = fill_RS_errlog (errlog);   // 337 log_the_error();   // 339
            } while (rc != 0);
        }

340 {
        int fill_RS_errlog(struct *errlog)
        {
            if (L2_ERROR)   // 342
            {
                if (new_error)   // 344      // 346
                    fill_in_errorlog();       // errlog.device_id=1
                else
                    errlog.device_id = errlog.device_id + 1;   // 348 num_proc_core = read_vpd_for_num_of_proc_core_per_chip();   // 350
        352 {
                if (errlog.device_id < num_proc_core)
                    return (1);
                else
                    return (0);
            }
            else
                fill_in_errorlog();   // 354
            return (0);   // 356
        }
```

METHOD OF DE-ALLOCATING MULTIPLE PROCESSOR CORES FOR AN L2 CORRECTABLE ERROR

BACKGROUND OF THE INVENTION

1. Technical Field

The present invention is directed generally toward a method of handling a memory error in a data processing system containing multiple processors. More specifically, the present invention is directed toward a method of de-allocating multiple processors sharing a failing bank of memory.

2. Description of Related Art

In its simplest form, a computer system is made up of a processor, memory, and input/output peripherals. The processor executes a linear sequence of instructions to operate on data. The data can be read in or written out using input/output peripherals. Both data and instructions may be stored in the memory for the use of the processor.

Although many early computers were no more complex than that just described, most computers manufactured today are more complex than this simple model. Modern computer systems often contain a number of features to enhance computing speed and efficiency.

Memory in modern computers is often arranged in a hierarchical fashion, using what are known as caches. Caches are like memory scratchpads. They are small banks of memory that can be read from or written to quickly-more quickly than to the computer system's main memory bank.

A cache, then, functions as a temporary storage location for data that is currently being worked with by the processor. A processor can work quickly with memory stored in a cache while other data is being transferred between the cache and main memory. Using a cache can often greatly increase the processing speed of a computer.

Many modern computer systems utilize multiple caches in cascade, where one cache is used as a temporary storage location for information stored in the next cache. In such systems, the cache closest in sequence to the processor is known as a "primary" or "level one" (L1) cache. The next is known as a "secondary" or "level two" (L2) cache, and so on.

Using multiple caches in cascade allows a computer system designer flexibility in balancing computing speed with cost. Because faster memories tend to be more expensive, one way to balance the conflicting objectives of low cost and high speed is to use a small primary cache, containing expensive but very fast memory, with a larger secondary cache, containing less expensive and slower memory than the primary cache, but faster memory technology than main memory.

Another speed-up mechanism commonly employed in computers is to provide in some form for multiple instructions to be processed at once. Pipelined and superscalar processors allow portions of computer instructions to be processed simultaneously. That is, one processor may process portions of two or more instructions simultaneously.

Multiprocessor computers utilize multiple processors to execute complete instructions independently. This can allow for a large increase in computing speed, particularly when executing programs that operate on large quantities of data values, such as graphics programs.

Having multiple processors also has a significant advantage in that it provides a level of redundancy and fault tolerance. That is, if a portion of a computer system containing multiple processors fails, it is sometimes possible for the problem to be circumvented by disabling one or more of the processors associated with the failure. When this occurs, instructions that would have been executed by the disabled processors can be diverted to other processors still operating.

In the past, each processor in a multiple processor computer was generally fabricated on its own integrated circuit. Today that is not always the case. Advances in Very Large-Scale Integrated Circuit (VLSI) technology have made possible the fabrication of multiple processors on a single integrated circuit. It is even possible to fabricate primary and secondary cache memory on the same integrated circuit.

Problems can arise, however, in the migration from single-processor integrated circuit technology to multiple-processor integrated circuit technology. Existing supporting hardware and software may not be readily compatible with newer integrated circuit designs. This makes migration to the newer technology difficult, because new supporting hardware and software must be developed to interoperate with the newer technology. Development of an entire line of new supporting technology is both costly and slow.

One such scenario in which migration is difficult involves a change from single-processor chips, each with its own secondary cache memory, to dual-processor chips, each with a shared secondary (L2) cache memory. In the older technology, a failing secondary cache meant that only one processor (the one associated with that memory) was affected. Thus, when an L2 memory failed, the supporting hardware and software reporting the problem to operating system software would only report one processor experiencing the problem. That one processor could then be disabled to prevent further errors.

In the newer technology, however, when an L2 memory fails, both processors sharing the L2 memory are affected. The supporting hardware and software, being designed to report a problem with only one processor, however, does not allow for both processors being disabled. Thus, in this scenario an incompatibility exists between the newer processor technology and the existing supporting hardware and software.

It would thus be beneficial if there were an error reporting method that would allow the newer multiple-processor integrated circuits to be compatible with existing supporting hardware and software designed to be used with single-processor integrated circuits.

SUMMARY OF THE INVENTION

Accordingly, the present invention provides a method by which existing supporting hardware and software may be made compatible with newer processor technology utilizing multiple processors with shared memory on a single integrated circuit. The present invention ensures that when a failure in the shared memory occurs, the failure is associated with all affected processors, so that all of the affected processors can be deactivated. In accordance with a preferred embodiment of the invention, the failure is reported multiple times, once for each of the affected processors. In this manner, multiple-processor integrated circuits with memory sharing may be utilized with existing error reporting technology that associates only one processor with a given failure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of illustrative embodiments when read in conjunction with the accompanying drawings, wherein:

FIG. 3 is a listing, in a C-like pseudocode, of a possible software implementation of the present invention.

DETAILED DESCRIPTION OF PREFERRED EMBODIMENTS

Figure 1A:
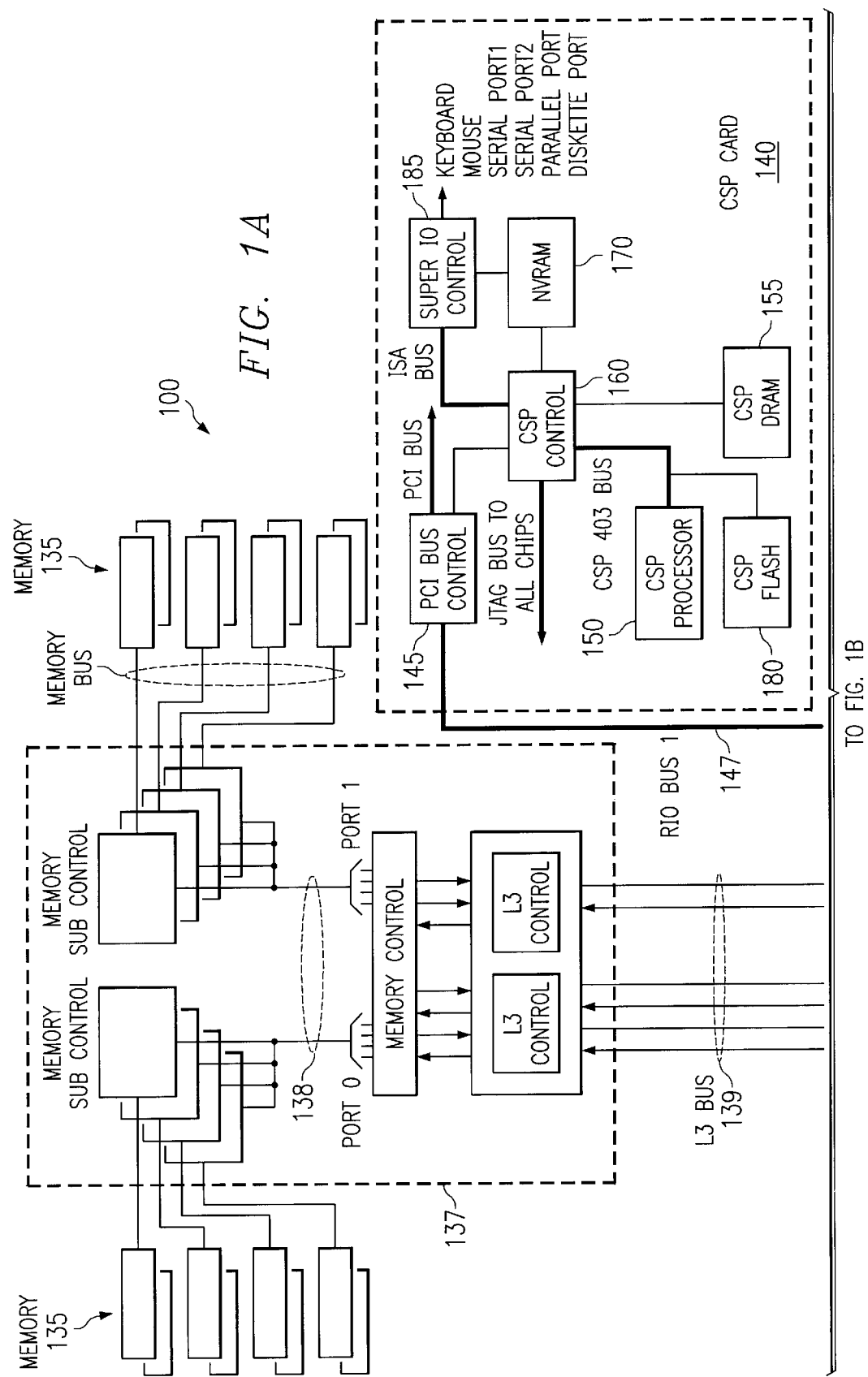
FIGS. 1A and 1B is a block diagram giving a overview of a computer system built in accordance with an embodiment of the present invention.
Figure 1B:
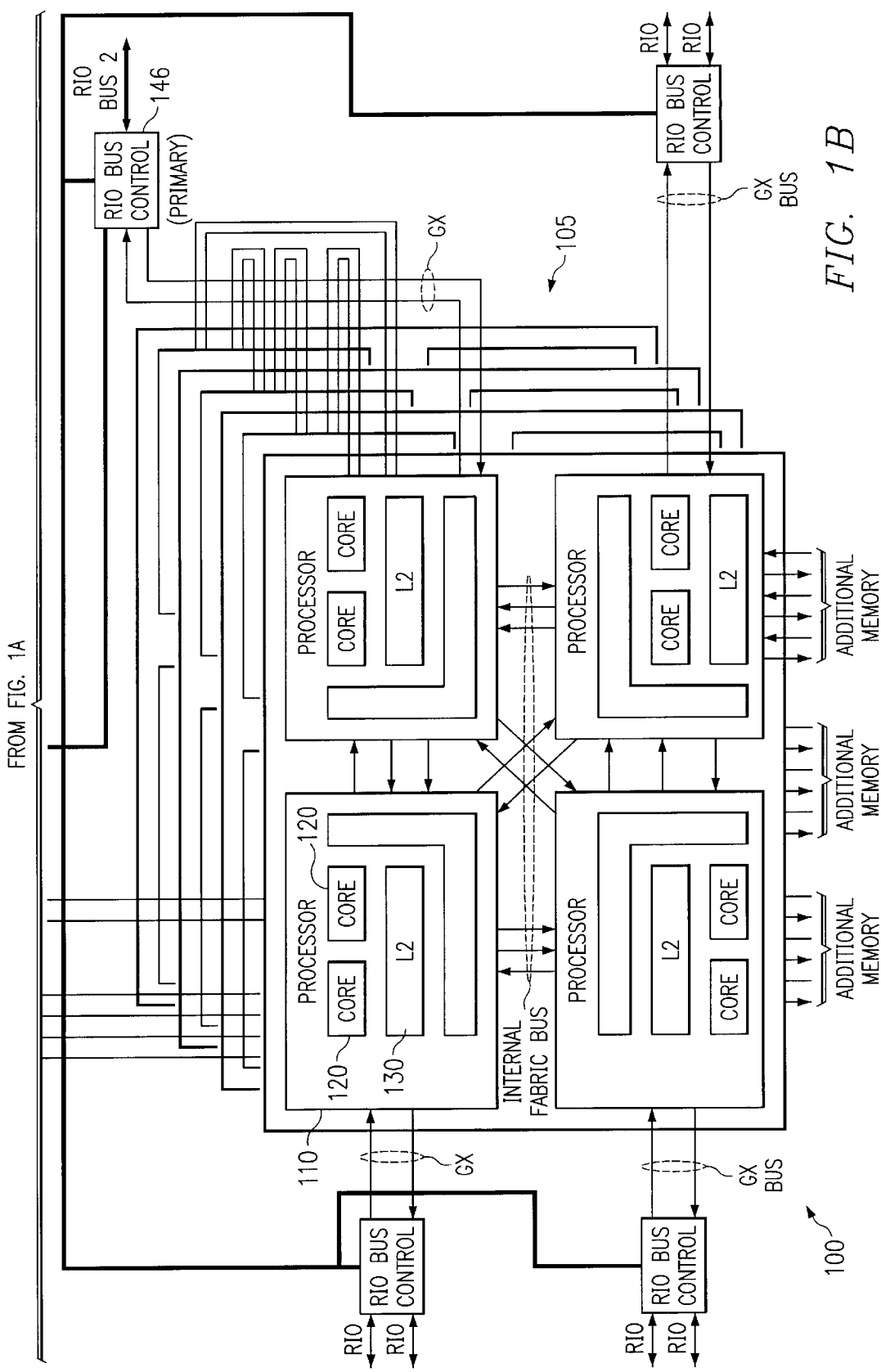

FIGS. 1A-1B provide a representation in block diagram form of a multiprocessor computer system 100 in accordance with an embodiment of the present invention. A processor array 105 is responsible for the bulk of computation within the computer system 100. Computer system 100 stores data in main memory 135 to be operated upon by processor array 105. Connecting processor array 105 with main memory 135 is a series of buses 138 and memory controllers 137 for directing the flow of information to and from different portions of main memory 135.

Processor array 105 contains a plurality of processor chips 110, each processor chip containing two processors 120 and a block of secondary cache memory (L2 memory) 130 shared by processors 120. L2 memory 130 is a temporary holding place for data being read or written to/from main memory 135.

Also present within system 100 is a Common Service Processor (CSP) card 140, which fulfills a supervisory role within the system. CSP card 140 contains a processor (the CSP) 150, dynamic random access memory (DRAM) 155, non-volatile random-access memory (NVRAM) 170, flash memory 180, an input/output controller 185, and control logic 160 to link the components of CSP card 140 together. CSP 150 is responsible for initializing the system. CSP 150 is also responsible for analyzing errors that may occur within the system and executes error analysis software to perform that task. CSP card 140 is connected to the rest of computer system 100 through a bus 147 that is controlled through bus controllers 145, 146.

Some errors are "recoverable;" others are not. A recoverable error is one in which the error can be corrected and data processing can continue. For instance, when a memory generates an error and outputs corrupted data, sometimes it is possible, through the use of error correction codes such as Hamming codes, to restore the corrupted data to its original value. This is a recoverable error. Usually, the only possible recoverable errors in a computer system are those in which only one bit is incorrect.

Recoverable memory errors are not always cause for alarm. A common cause of memory error is "alpha particle error." An alpha particle (helium nucleus), usually falling to earth from outer space, may enter a memory circuit and corrupt data. An alpha particle error is an isolated incident, and when it causes a recoverable error, it is generally no cause for alarm.

On the other hand, repeated recoverable memory errors are an indication that the memory circuitry is failing. When this happens, the memory is unreliable, and it may begin to produce unrecoverable errors. When repeated recoverable memory errors occur, it is best to disable the failing memory. When the memory is an on-board cache memory, it becomes necessary to disable the processor(s) using that memory as well.

When a recoverable error repeatedly occurs in L2 memory 130, CSP 150 logs the error in an error log located in non-volatile memory 170. In accordance with the present invention, the error is logged in non-volatile memory 170 once for each of processors 120 located on processor chip 110 on which the L2 memory 130 in question is located. This allows an operating system executing on computer system 100 to detect the error (by checking the error log) and deactivate processors 120, which share failing L2 memory 130. CSP 150 is aware of the number of processors in processor chip 130 because that information is stored in a Vital Product Data (VPD) section stored in flash memory 180.

Figure 2:
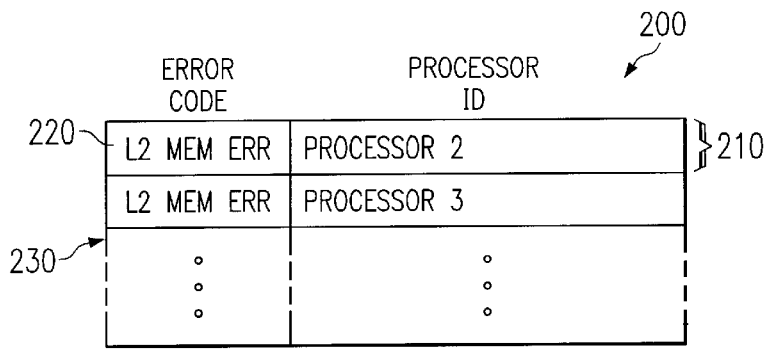
FIG. 2 is a diagram of the data structure used to log errors in an embodiment of the present invention.

FIG. 2 provides a representation of an error log 200 in accordance with an embodiment of the present invention. Each entry 210 in the table includes an error code 220 and a processor ID 230. Error code 220 denotes what type of error has occurred. For instance, in entry 210, an L2 memory error has occurred. The processor ID 230 denotes which processor is affected by the error. Only one processor ID 230 is allowed per entry 210. In an alternative embodiment of the invention, each entry may be located in its own separately allocated error log.

FIG. 3 provides a listing 300, in a C-like pseudocode, of a preferred embodiment of the present invention. Those skilled in the art will appreciate that an actual software implementation of the present invention is not limited to the use of the C language but may be implemented in any of a variety of computer languages, including but not limited to C++, Java, Forth, Lisp, Scheme, Python, Perl, and Assembly Languages of all kinds. It is also to be emphasized that this C-like pseudocode listing 300 is merely an example of one possible implementation of the present invention, included to clarify the basic concepts underlying the invention by providing them in a more concrete form. FIG. 3 should not be interpreted as limiting the invention to a particular software implementation.

The listing 300 first defines a structured data type "errlog" 305. Type "errlog" 305 represents a single error log providing memory space for information about one error. Included in type "errlog" 305 are data fields containing information about the type of error being logged, including a field "device_id" 307 to identify a device (for example, a processor) associated with the error.

Once an error has been detected by the CSP, function "log_this_error" 310 is called. In line 320 of function "log_this_error" 310, an integer variable "rc" is defined for holding a return code. Next, do-while loop 330 is entered. In do-while loop 330, on line 332, a new error log for the error is created. In other words, a new instance of type "errlog" 305 is created.

On line 333, if variable "rc" equals zero, then the new error log is filled in with details about the error (line 334), otherwise the data contained in the last-created error log is simply copied into the new error log (line 335).

In line 337, if the CSP is located in an RS/6000 (RISC System/6000) platform, then function "fill_RS_errlog" 340 is called (since this preferred embodiment is intended to be operable in an IBM RS/6000 computer system). Function "fill_RS_errlog" 340 first checks to see if the error is in L2 memory (line 342). If so, then in line 344, a determination is made as to whether the error log just created by function "log_this_error" 310 contains new data or contains data copied from a previously created error log. If the error log contains new data (in other words, the data was not copied in), then additional information concerning the error is stored in the new error log (line 346), including a value of 1 for field "device_id" 307. If the error log contains copied data, then the copied data is retained, but the value of field "device_id" 307 is incremented by 1.

In line 350, the number of processors on the same chip as the failing L2 memory (and associated with the L2 memory) is read in. On line 352, if the value of field "device_id" 307 is less than the number of processors (in other words, there are more processors to log errors for), function "fill_RS_errlog" 340 returns a value of 1, otherwise it returns 0.

On line 354, if the error was not an error in L2 memory, then the error is simply logged once with a call to function "fill_in_errorlog", and function "fill_RS_errlog" 340 returns a value of 0 (line 356).

Returning to function "log_this_error" 310, after function "fill_RS_errlog" 340 is called on line 357, the value returned by function "fill_RS_errlog" 340 is stored in variable "rc." The error log is then made available to the operating system by executing function "log_the_error" (line 339). Do-while loop 330 then repeats if variable "rc" is non-zero. If "rc" is zero at the end of do-while loop 330, function "log_this_error" 310 terminates.

Figure 4:
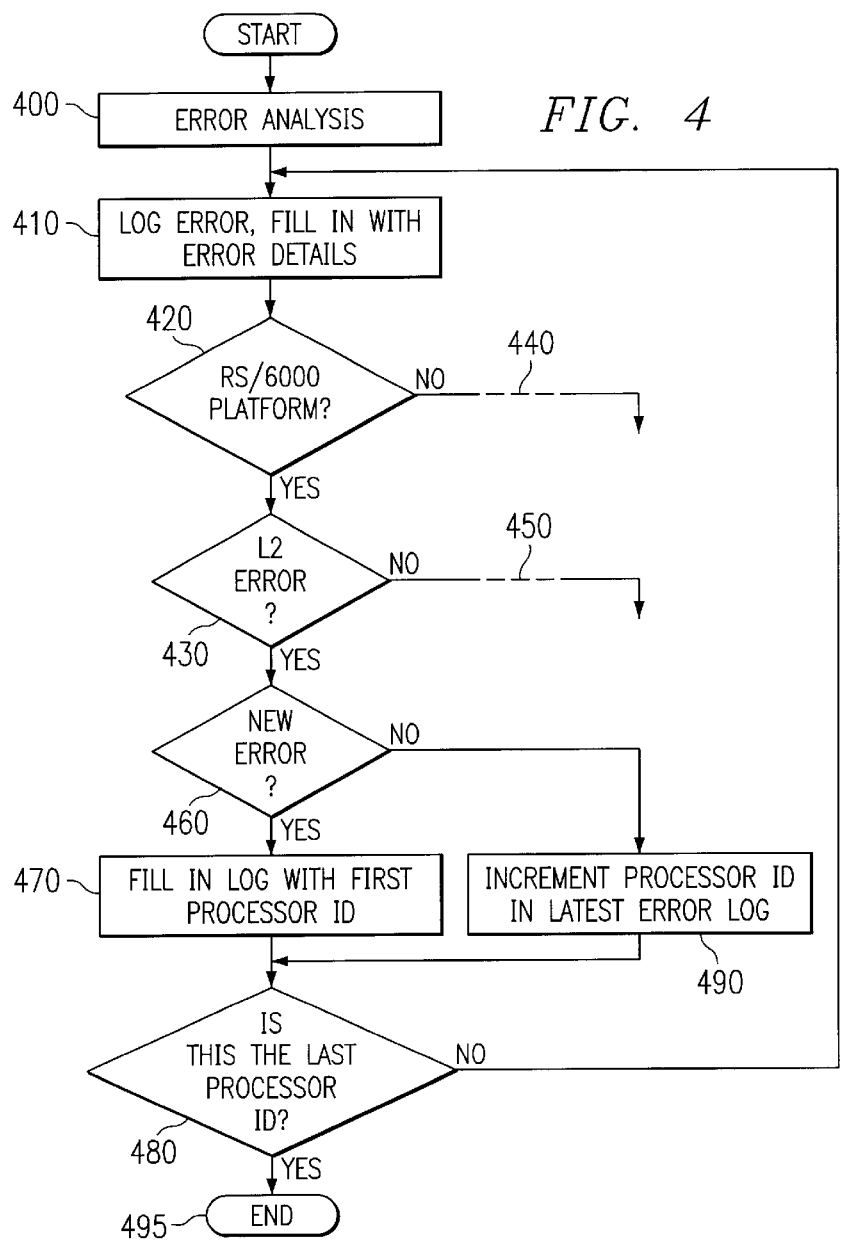
FIG. 4 is a flowchart representation of an embodiment of the present invention.

FIG. 4 provides a flowchart representation of the process taken by the CSP in addressing an error that may be a correctable L2 memory error in a preferred embodiment of the invention. First, the CSP performs an error analysis to detect an error and its type (step 400). Next, the error is logged along with details about the error, including what type of error occurred and in which item of hardware the error occurred (step 410).

If the CSP is operating in an RS/6000 platform (step 420) and it was an L2 error that was logged (step 430), then execution continues to step 460, otherwise the CSP continues with further error handling 440, 450. In step 460, if the error logged in step 410 was a new error (that is, it has not been logged before), then the processor ID for the first processor associated with the failing L2 memory is filled in as the processor ID in the error log (step 470).

Then if there are further processors associated with the L2 memory (step 480), the process repeats with step 410 and the error is logged a second time identically. This time, however, when step 460 is reached, because the error is not new, the latest logged error is assigned an incremented processor ID (step 490). If at step 480, all of the processors associated with the failing L2 memory have had errors logged for them, the process ends (step 495).

Once the errors have been logged for all processors associated with the failing L2 memory, appropriate action may be taken in response to the problem. In a preferred embodiment of the invention, the logged errors are communicated to the operating system. The operating system can then deconfigure all of the processors associated with the failing L2 memory.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for handling a hardware error in a multiple-processor computer system, comprising the steps of:
   (a) identifying a plurality of processors associated with a shared hardware component;
   (b) detecting a failure of the shared hardware component; and
   (c) responsive to step (b), reporting a plurality of errors, wherein each of the plurality of errors is associated with one of the plurality of processors.

2. The method of claim 1, wherein the plurality of errors is reported by entering the plurality of errors into an error log as a plurality of entries.

3. The method of claim 2, wherein each of the plurality of entries is associated with only one processor from the plurality of processors.

4. The method of claim 1, wherein the plurality of errors is reported by entering the plurality of errors into a plurality of error logs.

5. The method of claim 4, wherein each of the plurality of error logs is associated with only one processor from the plurality of processors.

6. The method of claim 1, wherein the shared hardware component is memory.

7. The method of claim 6, wherein the memory forms a secondary cache.

8. The method of claim 1, comprising the step of:
   (d) responsive to step (c), disabling the plurality of processors.

9. The method of claim 1, wherein the plurality of processors and the shared hardware component are formed using a single integrated circuit.

10. The method of claim 9, wherein the plurality of errors is reported by entering the plurality of errors into an error log as a plurality of entries.

11. The method of claim 10, wherein each of the plurality of entries is associated with only one processor from the plurality of processors.

12. The method of claim 9, wherein the shared hardware component is memory.

13. The method of claim 12, wherein the memory forms a secondary cache.

14. The method of claim 9, comprising the step of:
   (d) responsive to step (c), disabling the plurality of processors.

15. A computer program product, in a computer-readable medium, for handling a hardware error in a multiple-processor computer system, comprising instructions for:

(a) identifying a plurality of processors associated with a shared hardware component;

(b) detecting a failure of the shared hardware component; and (c) responsive to the instructions for (b), reporting a plurality of errors, wherein each of the plurality of errors is associated with one of the plurality of processors.

16. The computer program product of claim 15, wherein the plurality of errors is reported by entering the plurality of errors into an error log as a plurality of entries.

17. The computer program product of claim 16, wherein each of the plurality of entries is associated with only one processor from the plurality of processors.

18. The computer program product of claim 15, wherein the plurality of errors is reported by entering the plurality of errors into a plurality of error logs.

19. The computer program product of claim 18, wherein each of the plurality of error logs is associated with only one processor from the plurality of processors.

20. The computer program product of claim 15, wherein the shared hardware component is memory.

21. The computer program product of claim 20, wherein the memory forms a secondary cache.

22. The computer program product of claim 15, comprising instructions for:

(d) responsive to the instructions for (c), disabling the plurality of processors.

23. The computer program product of claim 15, wherein the plurality of processors and the shared hardware component are formed using a single integrated circuit.

24. The computer program product of claim 23, wherein the plurality of errors is reported by entering the plurality of errors into an error log as a plurality of entries.

25. The computer program product of claim 24, wherein each of the plurality of entries is associated with only one processor from the plurality of processors.

26. The computer program product of claim 23, wherein the shared hardware component is memory.

27. The computer program product of claim 26, wherein the memory forms a secondary cache.

28. The computer program product of claim 23, comprising instructions for:

(d) responsive to the instructions for (c), disabling the plurality of processors.

29. A system for fault-tolerant computing in a multiple-processor data processing environment, comprising:

a plurality of processors;

a hardware component shared by the plurality of processors;

a common service processor; and an operating system, wherein if the hardware component fails, the common service processor reports to the operating system a plurality of errors wherein each of the plurality of errors is associated with one of the plurality of processors.

30. The system of claim 29, comprising an error log, wherein the plurality of errors is reported by entering the plurality of errors into an error log as a plurality of entries.

31. The system of claim 30, wherein each of the plurality of entries is associated with only one processor from the plurality of processors.

32. The system of claim 29, wherein the plurality of errors is reported by entering the plurality of errors into a plurality of error logs.

33. The system of claim 32, wherein each of the plurality of error logs is associated with only one processor from the plurality of processors.

34. The system of claim 29, wherein the hardware component is memory.

35. The system of claim 34, wherein the memory forms a secondary cache.

36. The system of claim 29, wherein responsive to the plurality of errors being reported, the operating system disables the plurality of processors.

37. The system of claim 29, wherein the plurality of processors and the hardware component are formed using a single integrated circuit.

38. The system of claim 37, comprising an error log, wherein the plurality of errors is reported by entering the plurality of errors into an error log as a plurality of entries.

39. The system of claim 38, wherein each of the plurality of entries is associated with only one processor from the plurality of processors.

40. The system of claim 37, wherein the hardware component is memory.

41. The system of claim 40, wherein the memory forms a secondary cache.

42. The system of claim 37, wherein responsive to the plurality of errors being reported, the operating system disables the plurality of processors.

* * * * *